July 23, 1957
D. F. THOMAS ET AL
2,800,295
BALL TYPE VALVE
Filed Aug. 20, 1951
2 Sheets-Sheet 1
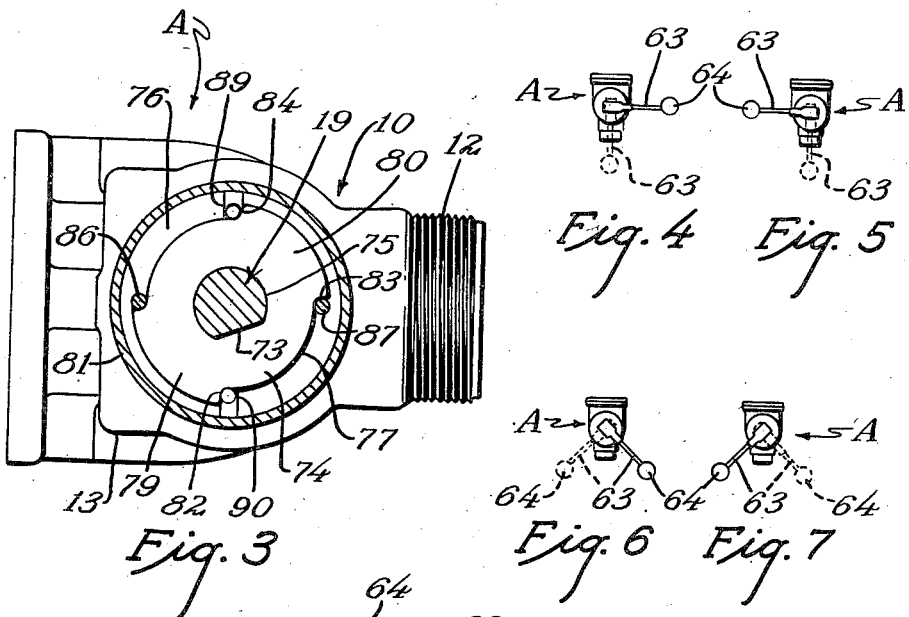
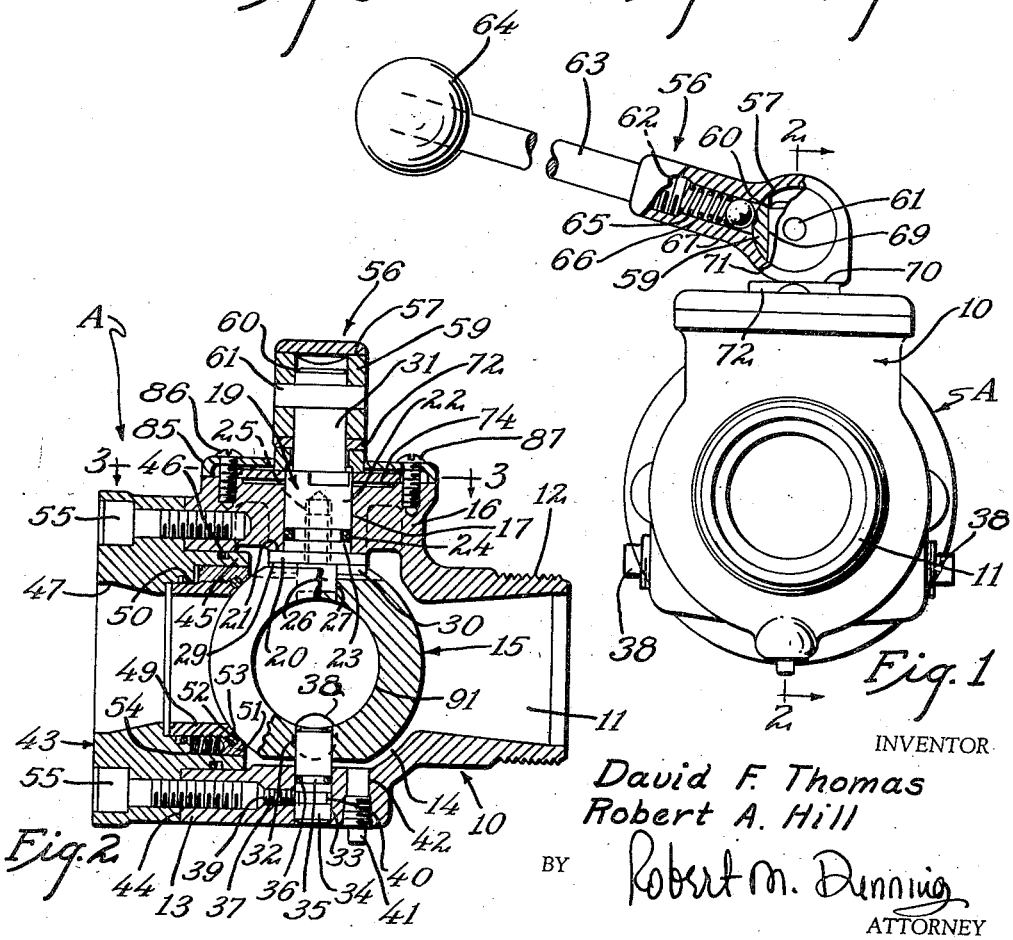
INVENTOR
David F. Thomas
Robert A. Hill
BY Robert M. Dunning
ATTORNEY July 23, 1957

D. F. THOMAS ET AL 2,800,295

BALL TYPE VALVE

Filed Aug. 20, 1951

INVENTOR
David F. Thomas
Robert A. Hill
BY Robert M. Dunning
ATTORNEY

United States Patent Office 2,800,295
Patented July 23, 1957

2,800,295
BALL TYPE VALVE

David F. Thomas, St. Paul, and Robert A. Hill, Minneapolis, Minn., assignors to Waterous Company, St. Paul, Minn.

Application August 20, 1951, Serial No. 242,612

10 Claims. (Cl. 251—290)

This invention relates to an improvement in a ball type valve and deals particularly with a type of ball valve which opens quickly.

A feature of the present invention resides in the provision of a valve having a valve ball which forms the valve closure. This valve ball seats against a resiliently urged sealing member which maintains an effective seal between the ball and the valve casing.

A feature of the present invention resides in the provision of a valve including a ball type valve element and a slidable sleeve structure urged toward this ball element. An O-ring is supported on the end of this slidable sleeve structure in constant contact with the ball. The sleeve is resiliently urged toward the ball by suitable spring means. Thus the sleeve is at all times urged into sealing relation with the ball.

A feature of the present invention resides in the fact that when the valve is in sealing position the sleeve supporting the O-ring is urged toward the ball by fluid pressure acting against a small area at the end of the slidable sleeve.

A further feature of the present invention resides in the provision of a valve which may be locked in adjusted position by suitable operating means. The operating structure is provided with means capable of frictionally holding the valve from rotation from an adjusted position.

A feature of the present invention resides in the details of construction and operation of the valve. The valve ball is provided with an aperture therethrough which supports a pair of opposed pivots. These pivots may, if desired, be withdrawn so that the ball may be removed. One of the pivots is supported by a valve stem which in turn is actuated by suitable operating means. This valve stem is provided with a tongue at one end engageable in a slot on the ball. The ball is provided with a slot extending at right angles to the axis of the opening through the ball. The tongue is engageable in this slot in such a way that the valve stem may assume either of two selected positions relative to the ball. A pair of crossed slots are provided on the opposite side of the valve ball, these slots being positioned at forty-five degrees to a plane through the axis of the valve ball opening. The ball may be inverted and the tongue of the valve stem selectively engaged in either of these crossed slots. As a result the position of the valve stem may be considerably varied to suit each individual installation.

An added feature of the present invention lies in the provision of a locking plate designed to limit pivotal movement of the valve stem. The locking plate is provided with two opposed segments projecting beyond the periphery of the remainder of the plate. The ends of these segments form shoulders engageable against fixed stops. The stops are arranged in diametrically opposed relation and the segments are arranged to permit rotation of the valve ball through ninety degrees. By removing the fixed stops and inserting them at ninety degrees from their original position, the direction of rotation required to open and close the valve may be reversed.

These and other objects and novel features of the present invention will be more clearly and fully set forth in the following specification and claims.

In the drawings forming a part of the specification:

Figure 1 is a front elevational view of the valve showing the construction thereof, a portion of the operating handle being broken away.

Figure 2 is a sectional view through the valve, the position of the section being indicated by the line 2—2 of Figure 1.

Figure 3 is a sectional view on a horizotnal plane through the upper portion of the valve, the position of the section being indicated by the line 3—3 of Figure 2.

Figures 4, 5, 6, and 7 are diagrammatic plan views of the valve showing the various positions in which the operating handle may be located.

Figure 8:
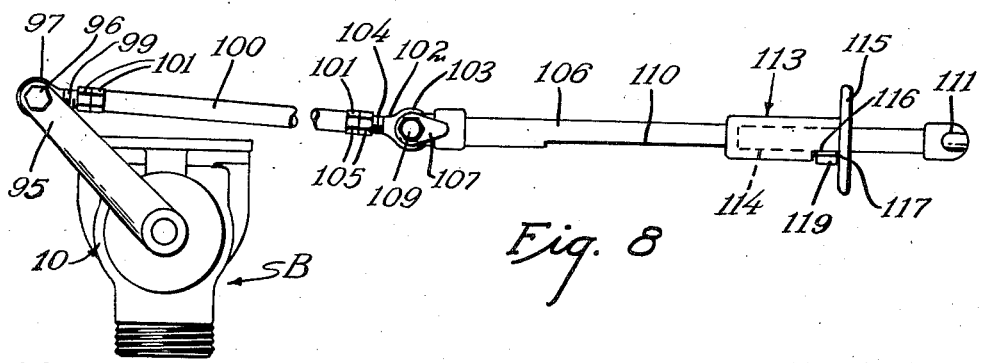

Figure 8 is a top plan view of a valve operating mechanism for operating the valve by remote control.

Figure 9:
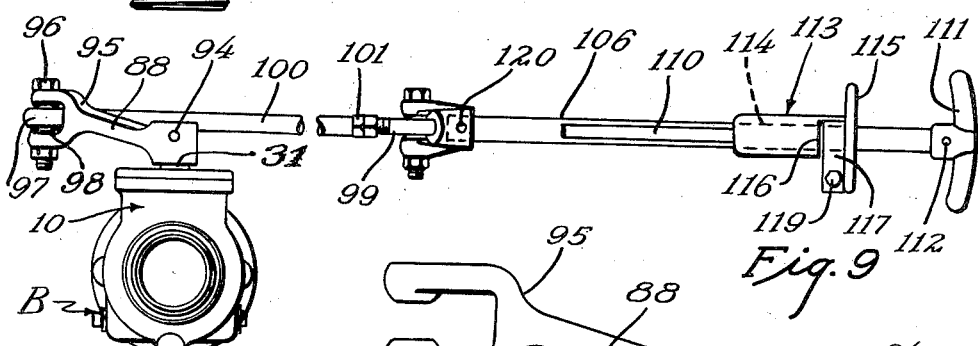

Figure 9 is a side elevational view of the remote control operating mechanism illustrated in Figure 8.

Figure 10:
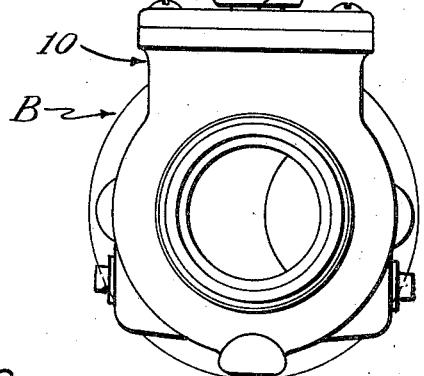

Figure 10 is a front elevational view of a modified form of valve designed for remote control operation of the type shown in Figures 8 and 9.

Figure 11:
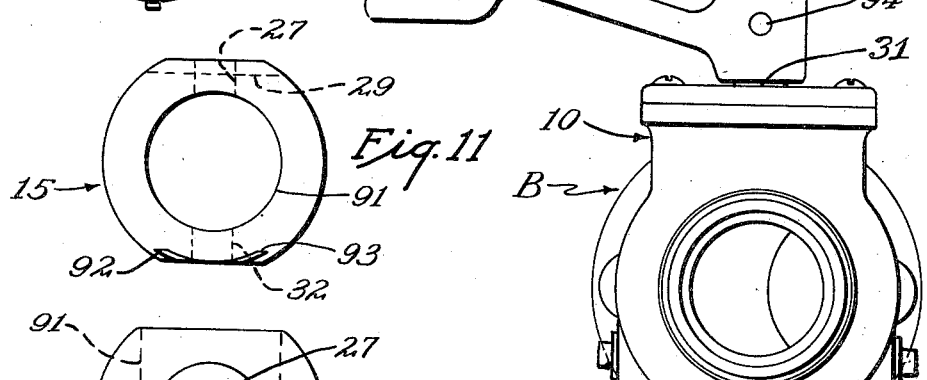

Figure 11 is an elevation view of the valve ball removed from the valve.

Figure 12:
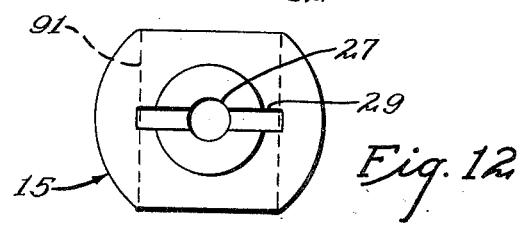

Figure 12 is a plan view of the valve ball removed from the valve.

Figure 13:
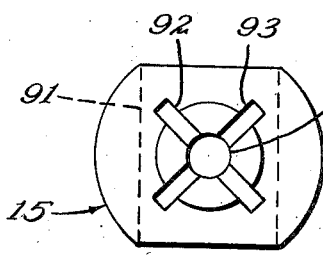

Figure 13 is a bottom plan view of the valve ball.

The valve which is designed for manual operation is best illustrated in Figures 1 through 7 of the drawings. This valve includes a valve housing 10 which includes a tubular outlet portion 11 having an externally threaded end 12 and a cylindrical sleeve 13 in opposed relation to the tubular outlet 11. The central portion of the valve body 10 is enlarged to form a valve cavity 14 which is designed to accommodate the valve ball 15. The valve ball 15 is of proper diameter to fit through the sleeve 13 for insertion and removal into the valve housing.

The valve housing includes a relatively large boss 16, the axis of which intersects the axis of the tubular outlet 11 and sleeve 13. A valve stem aperture 17 extends through this boss 16, the axis of the aperture 17 intersecting the axis of the outlet and sleeve. A valve stem 19 is rotatably supported within the aperture 17. This valve stem 19 includes a disc shaped head 20 at its lower extremity designed to engage against a machined surface 21 at the lower end of the valve stem aperture 17. The valve stem 19 also includes a pivot portion 22 of proper diameter to fit snugly within the aperture 17. This stem portion 22 is grooved as indicated at 23 to accommodate an O-ring 24. The O-ring 24 forms a seal between the valve stem 19 and the wall of the aperture 17, thus preventing leakage about the valve stem.

The lower end of the valve stem 19 is provided with an axial threaded socket to accommodate a screw 25 having a cylindrical head 26. This head 26 projects below the disc 20 to form a support for the valve ball 15. The valve ball 15 is provided with a recess 27 designed to accommodate the screw head 26 so as to detachably connect the valve ball to the valve stem.

A pair of aligned tongues 29 and 30 project downwardly from the valve stem head 20 on opposite sides of the screw head 26. These tongues are designed to engage in a slot in the valve ball 15. The arrangement and location of the slots in the valve ball which are designed to accommodate the tongue means 29 and 30 will be later described in detail.

The valve stem 19 includes a smaller diameter portion 31 which projects axially above the pivot portion 22. This portion of the valve stem is designed for engagement with the valve operating lever which will be later described in detail.

The valve ball 15 is provided with a second aperture 32 which is aligned with the aperture 27 and which is diametrically opposed with relation thereto. An aperture 33 is provided in the casing 10 which is in alignment with the valve stem aperture 17. A stud 34 is detachably supported by the valve casing and extends into the valve ball aperture 32 to act as a pivotal support therefor. The plug 34 is grooved as indicated at 35 to accommodate an O-ring 36 which tends to seal the plug from leakage. A longitudinally extending recess 37 is provided in the valve casing 10 and is designed to accommodate set screws 39 designed to hold the stud 34 in place. A groove 40 encircles the stud 34 and accommodates the end of a set screw 39 to hold the plug from longitudinal movement.

A drain plug 41 is supported in a drain passage 42 at the lower extremity of the housing 10 beneath the valve ball 15. This plug may be removed for draining the valve casing when desired.

A pair of drain openings are provided in opposite sides of the valve, and are shown closed by drain plugs 38. In actual practice one or both of these drain openings are usually connected to drain pipes normally closed by valves, to facilitate the draining operation when the valve is connected to a hose line or the like.

A flange 43 is supported at the inlet end of the valve. This flange 43 has a forward surface 44 designed to abut against the end of the sleeve 13 and includes a projecting portion 45 designed to extend into the sleeve 13. The outer surface of the projecting portion 45 of the flange 43 is grooved to accommodate an O-ring 46 which forms a seal between the flange 43 and the sleeve 13. The flange 43 is designed for attachment to a suitable fixture and acts to reduce the size of the inlet, the flange having an inlet passage 47 extending therethrough which is of substantially smaller diameter than the interior of the sleeve 13.

A sleeve-like inner housing 49 slidably fits within the projecting portion 45 of the flange 43. An O-ring 50 is positioned between the outer surface of the inner housing 49 and the inner surface of the flange projecting portion 45 to form a seal between these parts. An outer housing 51 is threaded onto the outer surface of the inner housing 49. The outer housing 51 is provided with an outside diameter which fits within a portion of the flange 43, this fit being sufficiently free to permit relative sliding between the parts. A groove 52 is formed at the juncture between the inner and outer housings for accommodation of an O-ring 53. This O-ring 53 fits against the outer surface of the valve ball 15 and the inner ends of the inner and outer housings are beveled to loosely fit the contour of the valve ball.

From the foregoing description, it will be noted that the O-ring 53 is centered at substantially the juncture between the inner housing 49 and the outer housing 51, while the O-ring 50 is centered outwardly of the inner housing 49. Therefore when there is fluid pressure in the valve inlet, this fluid pressure is exerted against the entire inner area to the left of the inner housing 49 as viewed in Figure 2. However, the fluid pressure will be exerted only against a portion of the right hand end of the inner housing 49 as viewed in this figure due to the location of the O-ring 53. Accordingly, when the valve is closed there will be a slight additional pressure against the inner housing 49 urging this inner housing, together with the outer housing carried therewith toward the valve ball. A series of springs 54 are positioned between portions of the outer housing 51 and the casing member 45 to cause the seal to engage resiliently against the valve ball 15.

The flange 43 is connected to the body 10 of the valve by a series of angularly arranged cap screws 55. One of these cap screws 55 is in alignment with the set screws 39 so that the set screws may be inserted before the cap screws 55 are inserted. As it is necessary to remove the flange 43 before the valve ball 15 may be removed, the mounting of the set screws in this way does not complicate the assembly and disassembly process.

As best illustrated in Figure 1 of the drawings a socket 56 is connected to the upper end 31 of the valve stem. The socket 56 is provided with a cylindrical aperture 57 therethrough, this aperture being arranged on an axis at right angles to the axis of the socket 56. A cylindrical member 59 fits within the aperture 57 to rotate freely therein. This cylinder 59 is provided with a vertical aperture 60 therein designed to accommodate the upper end 31 of the valve stem. A pin 61 extends through the cylinder 59 axially thereof and through the end 31 of the valve stem so as to pivotally connect the socket 56 with the valve stem.

The socket 56 is provided with a threaded aperture 62 in its extremity which is designed to accommodate the operating arm 63. This arm is provided with a knob 64 to facilitate operation of the arm. A spring 65 is provided in a longitudinally extending aperture 66 aligned with the threaded socket 62. A ball 67 is urged against the cylinder 59 by the spring 65. A notch or detent 69 is provided in the surface of the cylinder 59, this notch being engageable with the ball 67 in one position of the arm 63 to hold the arm from normal pivotal movement.

The socket 56 is provided with a flattened undersurface 70 which communicates with a cam surface 71. In unlocked position of the valve the flattened surface 70 of the socket 56 is engaged against a spacer 72 encircling the upper portion of the valve stem. However, by pivoting the arm 69 downwardly the cam portion 71 is engaged with the upper surface of the spacer 72, thereby tending to frictionally lock the operating arm from movement.

The upper end of the valve stem portion 22 is provided with a flat side 73 and a locking plate 74 is mounted upon the valve stem for rotation in unison therewith. The valve plate 74 is provided with an irregularly shaped aperture 75 which corresponds to the shape of the upper end of the valve stem portion 22 to cause rotation of the two parts in unison. The locking plate 74 is provided with opposite arcuate sides 76 and 77 which extend slightly more than one-fourth of the circumference of the locking plate. Arcuate segments 79 and 80 project beyond the periphery of the arcuate edges 76 and 77, thereby forming abutments between the two diameter portions of the plate. Shoulders 81 and 82 are formed at opposite ends of the segment 79 while similar shoulders 83 and 84 are provided at opposite ends of the segment 80.

A cap plate or cover 85 overlies the upper surface of the valve boss 16 and acts as a cover for the locking plate 74. The cover 85 is held in place by two diametrically opposed screws 86 and 87. These screws are engaged in threaded apertures in the boss 16 forming a part of the valve casing 10. A second pair of diametrically opposed threaded apertures 89 and 90 are provided in the boss 16, these apertures 89 and 90 being designed to accommodate the screws 86 and 87.

As indicated in Figures 11 and 12 of the drawings, the valve ball 15 is provided with a slot 29 in one surface, this slot being arranged on a plane normal to the axis of the passage 91 through the valve ball 15. Thus when the tongue 30 of the valve stem is engaged in the slot 29, the handle may pivot between the extreme positions illustrated in Figure 4 of the drawings. If it is desired that the operating handle pivot between the extreme positions shown in Figure 5 of the drawings, this may be accomplished by changing the position of the screws 86 and 87 and mounting them in the threaded apertures 89 and 90 instead of in the position illustrated in Figure 3. Thus the direction of movement of the valve may be regulated by merely changing the position of the screws 86 and 87 holding the cap or cover 85 in place.

As indicated in Figure 13 of the drawings the valve ball is provided with a pair of intersecting grooves 92 and 93 in the surface of the ball opposite that containing the groove 29. Thus when the valve ball 15 is in the position shown in Figure 2 of the drawings, the grooves 92 and 93 are in the undersurface of the valve ball and are not operative. However, if it is desired to provide an operating handle movement somewhat different from that shown in Figures 4 and 5, the valve ball may be inverted in position so that the tongue 30 of the valve stem 19 engages in either of these grooves 92 or 93. When the tongue 30 is engaged in either one of these grooves and the locking plate 74 inverted, the handle may move between the positions shown in Figure 6. It will be noted that the flat surface 73 of the valve stem 19 is arranged on a plane at an angle of twenty-two and one-half degrees from a vertical plane through the longitudinal axis of the valve when the valve is in the position shown in Figure 3. As a result, inverting the plate 80 will result in turning the plate through an angle of forty-five degrees. Thus virtually any operation of the operating handle may be obtained to suit each individual installation.

In Figures 8 through 10 of the drawings a modified form of construction is illustrated. The valve B is virtually identical with the valve A, with the exception of the manner in which the operating lever is attached to the valve stem. Accordingly the inner details of the valve are not illustrated as they are identical to the construction previously described.

Figures 8 and 9 disclose the operating levers by means of which the valve may be actuated by remote control. The valve B includes an operating arm 95 which is fastened to the valve stem illustrated in Figure 10. The arm is provided with a vertical aperture at one end, which is of proper size to fit snugly upon the projecting portion 31 of the valve stem 19. A pin 94 extends through the arm 95 and through the valve stem portion 31 to hold the parts assembled. The arm 95 is provided with a bifurcated outer end through which a bolt 96 may extend to hold the arm pivotally connected with a rod end 97. The rod end 97 includes a ring-shaped extremity having an inner bearing surface comprising a spherical segment and rotatably supporting a spherical segment through which the bolt 96 extends. The rod end 97 also includes a threaded shank 99. This shank 99 is designed to extend into an internally threaded tube 100 of any desired length. Lock nuts 101 hold the tube from disengagement from the shank 97.

The tube 100 acts to connect the rod end 97 to a similar rod end 102. This rod end 102 is provided with a ring shaped extremity 103 and a threaded shank 104. The threaded shank 104 threads into the tube 100 and is held in place by lock nuts 105.

The ring shaped end 103 has an inner bearing surface which is a spherical segment in shape, and rotatably supports a spherical segment through which a pivot bolt 109 extends. A slidable rod 106 is provided at one end with a clevis 107 which is bifurcated to accommodate the pivot bolt 109. A pin 120 secures the clevis 107 to the rod 106. The rod 106 is provided with an elongated flat surface 110 extending along one side thereof. The rod is provided with a handle 111 at its outer extremity, the handle having a socket therein which is designed to accommodate the end of the rod 106. The parts are held locked together by a pin 112.

The rod 106 extends through a bracket 113 which may be mounted to any suitable stationary part. The bracket 113 includes an elongated barrel 114 which is provided with a cylindrical aperture therethrough. A mounting plate 115 is secured to one end of the barrel 114. The barrel 114 is notched as indicated at 116. A flat spring blade 117 is secured at 119 to the mounting plate 115 and extends into the notch 116, this flat spring plate engaging against the flat surface 110 of the rod 106. Normally the spring plate 117 may be slightly spaced from the flat surface or may contact the flat surface lightly.

When it is desired to lock the operating mechanism in a predetermined position the handle 111 is turned so as to turn the rod 106 about its axis. This causes the rounded surface of the rod to engage against the spring plate and to frictionally hold the rod from longitudinal movement. Thus the rod may be held in any desired position. Thus it will be seen that the valve may be controlled by remote control through the operating mechanism best illustrated in Figures 8 and 9 of the drawings and may be locked in any position. Thus while the handle itself does not lock as in the valve A, the valve arm actuating mechanism may be fixed in any desired position.

The operation of the valve is believed obvious from the foregoing description. The manner in which the arm 63 of the valve A may be actuated to pivot the valve stem 19 has been described. As shown in Figure 1 of the drawings, the lower side of the aperture 57 extending transversely through the socket member 56 is notched so as to permit oscillation of the socket about the axis of the pivot pin 61. When the handle is in the normal raised position shown in Figure 1 of the drawings the lock is disengaged and the arm may pivot freely. However, by pressing downwardly on the arm 63, the cam portion 71 of the socket may bear against the spacer 72 urging this spacer downwardly. This spacer bears against the locking plate 74 and tends to hold the valve from pivotal movement about the axis of the valve stem 19.

In accordance with the patent statutes, we have described the principles of construction and operation of our ball type valve, and while we have endeavored to set forth the best embodiments thereof, we desire to have it understood that obvious changes may be made within the scope of the following claims without departing from the spirit of our invention.

We claim:

1. A valve including a valve housing, a valve ball having an aperture therethrough rotatably supported in said housing, a valve stem projecting from said housing, an invertable locking plate secured to said valve stem and rotatable therewith, a projecting segment on said locking plate extending slightly less than one quarter of the circumference of the locking plate, said segment being substantially one hundred thirty five degrees from its original position when inverted, and stop means on said housing in diametrically opposed relation, selectively mounted in either of two positions substantially ninety degrees apart, for engaging said projecting segment in opposite extreme position of said valve stem.

2. The structure defined in claim 1 and including a detachable connection between said valve stem and said valve ball said stem being engageable with said ball at relative angles of ninety degrees from its original position.

3. The structure defined in claim 1 and including a detachable connection between said valve stem and said valve ball, said stem being engageable with said ball at relative angles of forty-five degrees and ninety degrees from its original position.

4. The structure defined in claim 1 and including a detachable connection between said valve stem and said valve ball, said valve being engageable with one portion of said ball at relative angles of ninety degrees and engageable with a diametrically opposite side of said ball at a relative angle of forty-five degrees from original position.

5. A valve including a valve housing, a valve ball having an aperture therethrough rotatably supported in said housing, a valve stem projecting from said housing, an invertable locking plate mounted on said valve stem for rotation therewith, a pair of spaced shoulders on said valve plate, said shoulders being slightly more than ninety degrees apart, a stop adjustably between said shoulders engageable therewith to permit angular movement of substantially ninety degrees, said stop being selectively supported in either of two positions substantially ninety degrees apart, said locking plate when inverted having its shoulders substantially forty-five degrees from their original position.

6. A valve including a valve housing having an inlet and an outlet, a valve element having an aperture therethrough, means pivotally supporting said valve element so that it may pivot from an open position connecting said inlet and outlet to a closed position disconnecting said inlet and outlet, a valve stem pivotally supported by said housing, cooperable means connecting said valve stem and said valve element for causing rotation thereof in unison, a locking plate removably secured on said valve stem for rotation therewith, said housing having angularly spaced apertures therein substantially ninety degrees apart, a stop selectively engaged in any of said apertures, said locking plate including shoulders engageable with said stop to limit movement of said valve stem in either direction to substantially ninety degrees, engagement of said stop in a different aperture providing a different rotative relation between the valve element and the casing, said locking plate being invertable, inversion of said locking plate changing the angular relation between said shoulders and said valve stem.

7. The structure defined in claim 6 and in which the stop comprises a threaded member, and the angularly spaced apertures are arranged with their axes parallel to the axis of said valve stem, and are internally threaded.

8. A valve including a valve housing having an inlet and an outlet, a valve ball having an aperture therethrough, means pivotally supporting said ball so that said ball may pivot from an open position connecting said inlet and outlet to a closed position disconnecting said inlet and outlet, a valve stem pivotally supported by said housing, cooperable means connecting said valve stem and said ball for causing rotation thereof in unison, a locking plate on said valve stem for rotation in unison therewith, said locking plate including spaced shoulders, said housing having apertures therein angularly spaced substantially equally to the spacing of said shoulders, stop means selectively engaged in alternate of said apertures and selectively engageable with said shoulders upon rotation of said locking plate to limit pivotal movement of said valve stem in each direction, and cap means encircling the valve stem and overlying the locking plate, said cap means being held in place by said stop means.

9. A valve including a valve housing having an inlet and an outlet, a valve element having an aperture therethrough, means pivotally supporting said valve element so that it may pivot from an open position connecting said inlet and outlet to a closed position disconnecting said inlet and outlet, a valve stem pivotally supported by said housing, cooperative means connecting said valve stem and said valve element for causing rotation thereof in unison, a locking plate on said valve stem for rotation therewith, said housing having angularly spaced apertures therein, a stop selectively engaged in any of said apertures, said locking plate including shoulders engageable with said stop to limit movement of said valve stem in either direction, engagement of said stop in a different aperture providing a different rotative relation between the valve element and the casing, means on said casing with which the under surface of said locking plate may engage upon downward movement thereof, and cam means urging said locking plate downwardly against said engaging means on said casing to resist rotative relative movement.

10. A valve including a valve housing, a valve element pivotally supported therein, a valve stem connected to said valve element for pivotal movement in unison therewith, said valve stem projecting from said housing, a handle pivotally connected to said valve stem on an axis normal to the axis of the valve stem, a cam forming a part of said handle, a locking plate encircling said valve stem beneath said handle, said cam urging said plate against said housing upon pivotal movement of said handle about its axis to frictionally hold said valve element in adjusted relation.

References Cited in the file of this patent

UNITED STATES PATENTS

| | | |
|---|---|---|
| 280,176 | Higgins | June 26, 1883 |
| 914,209 | Watson | Mar. 2, 1909 |
| 1,104,918 | Mouat | July 28, 1914 |
| 1,520,233 | Gabriel | Dec. 23, 1924 |
| 1,558,992 | Lombardi | Oct. 27, 1925 |
| 1,570,637 | Nordstrom | Jan. 26, 1926 |
| 1,784,381 | O'Stroske | Dec. 9, 1930 |
| 1,789,390 | Potteiger | Jan. 20, 1931 |
| 1,814,534 | VanEtten | July 14, 1931 |
| 1,818,703 | Forman | Aug. 11, 1931 |
| 1,984,770 | Sorensen | Dec. 18, 1934 |
| 2,017,383 | Winterson et al. | Oct. 15, 1935 |
| 2,049,805 | Heinen | Aug. 4, 1936 |
| 2,521,659 | Wendell | Sept. 5, 1950 |
| 2,523,617 | Freeman | Sept. 26, 1950 |
| 2,529,412 | Parker | Nov. 7, 1950 |
| 2,558,260 | Maky | June 26, 1951 |